US010639958B2

(12) United States Patent
Tsuzaki et al.

(10) Patent No.: US 10,639,958 B2
(45) Date of Patent: May 5, 2020

(54) AIR CONDITIONING DEVICE (71) Applicant: TOYOTA BOSHOKU KABUSHIKI KAISHA, Aichi (JP)

(72) Inventors: Atsushi Tsuzaki, Aichi (JP); Hiroshi Murahata, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/730,799

(22) Filed: Oct. 12, 2017

(65) Prior Publication Data

US 2018/0105014 A1 Apr. 19, 2018

(30) Foreign Application Priority Data

Oct. 14, 2016 (JP) .................................. 2016-202503

(51) Int. Cl.
*B60H 1/00* (2006.01)
*B60N 2/56* (2006.01)
*B60N 2/68* (2006.01)

(52) U.S. Cl.
CPC ..... *B60H 1/00285* (2013.01); *B60H 1/00464* (2013.01); *B60H 1/00521* (2013.01);
(Continued)

(58) Field of Classification Search
CPC ............ B60H 1/00285; B60H 1/00464; B60H 1/00521; B60H 1/00528; B60H 2001/0621; F04D 29/4226; F04D 29/4253; F04D 29/626; B60N 2/56; B60N 2/5621; B60N 2/5635; B60N 2/5642; B60N 2/565; B60N 2/5657
See application file for complete search history.

(56) References Cited

U.S. PATENT DOCUMENTS 3,595,029 A * 7/1971 Lende, Jr. .......... B60H 1/00007
165/42
4,672,819 A * 6/1987 Mino ................. B60H 1/00371
165/76
(Continued)

FOREIGN PATENT DOCUMENTS

JP 2016-55783 4/2016
WO 2015/156218 10/2015

OTHER PUBLICATIONS

Office Action issued in JAPAN Counterpart Patent Appl. No. 2016-202503, dated Feb. 18, 2020, along with an English translation thereof.

*Primary Examiner* — Eric S Ruppert
*Assistant Examiner* — Hans R Weiland
(74) *Attorney, Agent, or Firm* — Greenblum & Bernstein, P.L.C.

(57) ABSTRACT

An air conditioning device is provided. The air conditioning device comprises a fan and is provided on an underside of a seating surface of a vehicle seat. The fan comprises a case module and a restrictor. The case module comprises a first case and a second case. The first case is located at a side of the fan where the seating surface is located. The second case is located at a side of the fan opposite to the seating surface and is assembled to the first case. The restrictor is configured to restrict assembling of the first case and the second case to each other when an orientation of the second case with respect to the first case is different from a specified orientation.

20 Claims, 8 Drawing Sheets

(52) U.S. Cl.
CPC .......... *B60N 2/565* (2013.01); *B60N 2/5657* (2013.01); *B60N 2/682* (2013.01)

(56) References Cited

U.S. PATENT DOCUMENTS

| | | | |
|---|---|---|---|
| 6,553,923 B2 * | 4/2003 | Gatley, Jr. ........... | F04D 29/4226 110/162 |
| 6,736,452 B2 * | 5/2004 | Aoki .................. | B60H 1/00285 297/180.13 |
| 7,560,663 B2 * | 7/2009 | Schehr ................ | B60H 1/2225 219/202 |
| 9,061,566 B2 * | 6/2015 | Hoehn ................. | F16B 5/0012 |
| 2017/0036575 A1 | 2/2017 | Kobayashi et al. | |

* cited by examiner

AIR CONDITIONING DEVICE

CROSS-REFERENCE TO RELATED APPLICATIONS

This application claims the benefit of Japanese Patent Application No. 2016-202503 filed on Oct. 14, 2016 with the Japan Patent Office, and the disclosure of which is incorporated herein by reference.

BACKGROUND

The present disclosure relates to an air conditioning device.

As disclosed in Japanese Unexamined Patent Application Publication No. 2016-55783, a seat cushion to which an air conditioning device is attached has been known. The air conditioning device comprises a fan, a duct, etc. The duct couples the fan to a ventilation passage formed in the seat cushion.

SUMMARY

There is an instance in which a case module of the fan is formed by assembling a first case and a second case to each other. An orientation of the second case with respect to the first case needs to be a specified orientation. However, in some cases, the second case and the first case may be erroneously assembled to each other in a state where the orientation of the second case with respect to the first case is different from the specified orientation.

It is desirable in one aspect of the present disclosure to provide an air conditioning device that can inhibit assembling of the second case and the first case to each other in a state where an orientation of the second case with respect to the first case is different from a specified orientation.

One mode of the present disclosure is an air conditioning device provided on an underside of a seating surface of a vehicle seat, and the air conditioning device comprises a fan that blows air out or draws air in. The fan comprises a case module and a restrictor. The case module comprises a first case and a second case. The first case is located at a side of the fan where the seating surface is located, and the second case is located at a side of the fan opposite to the seating surface and is assembled to the first case. The restrictor is configured to restrict assembling of the first case and the second case to each other when an orientation of the second case with respect to the first case is different from a specified orientation.

The air conditioning device of the present disclosure can inhibit the assembling of the second case and the first case to each other in a state where the orientation of the second case to the first case is different from the specified orientation.

The air conditioning device of the present disclosure may further comprise, for example, the following Configuration 1.

[Configuration 1]

The restrictor is at least one rib provided in a first one of the first case and the second case. When the orientation of the second case with respect to the first case is different from the specified orientation, the at least one rib abuts a second one of the first case and the second case, thereby restricting the assembling of the first case and the second case to each other.

When the air conditioning device of the present disclosure further comprises the aforementioned Configuration 1, it is further ensured that the air conditioning device of the present disclosure can inhibit the assembling of the second case and the first case to each other in the state where the orientation of the second case to the first case is different from the specified orientation.

The air conditioning device of the present disclosure may further comprise, for example, the following Configuration 2.

[Configuration 2]

The first case comprises a stopper and the second case comprises a stopped portion, and the stopper and the stopped portion are assembled to each other via a securing member. The at least one rib surrounds at least a part of the securing member when viewed horizontally from one side of an outer circumference of the at least one rib.

When the air conditioning device of the present disclosure further comprises the aforementioned Configuration 2, the at least a part of the securing member is surrounded by the at least one rib when viewed horizontally from the aforementioned one side of the outer circumference of the at least one rib. Thus, the securing member can be inhibited from interfering with or damaging peripheral members that are peripheral to the securing member.

The air conditioning device of the present disclosure may further comprise, for example, the following Configuration 3.

[Configuration 3]

A harness is routed in a rear side of the air conditioning device. A material of a contact surface of the at least one rib to be in contact with the harness includes resin.

When the air conditioning device of the present disclosure further comprises the aforementioned Configuration 3, damage to the harness routed in the rear side of the air conditioning device can be inhibited by the at least one rib. The contact surface of the at least one rib to be in contact with the harness may be formed of resin.

BRIEF DESCRIPTION OF THE DRAWINGS

Example embodiments of the present disclosure will be described hereinafter by way of example with reference to the accompanying drawings, in which.

DETAILED DESCRIPTION OF THE PREFERRED EMBODIMENTS

First Embodiment

1. Configuration of Vehicle Seat 1

(1) Overall Configuration of Vehicle Seat 1

Figure 1:
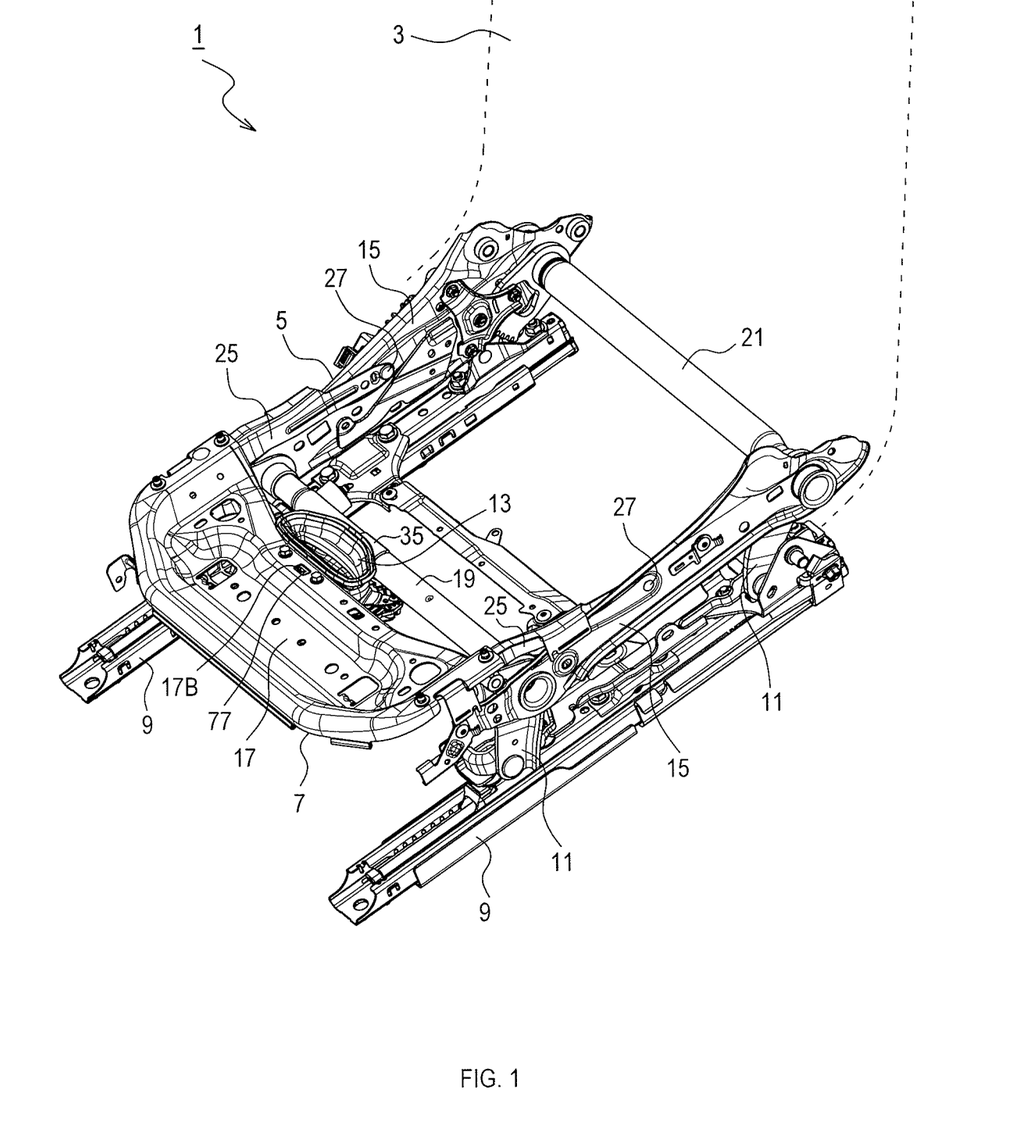
FIG. 1 is a perspective view showing a configuration of a vehicle seat.
Figure 2:
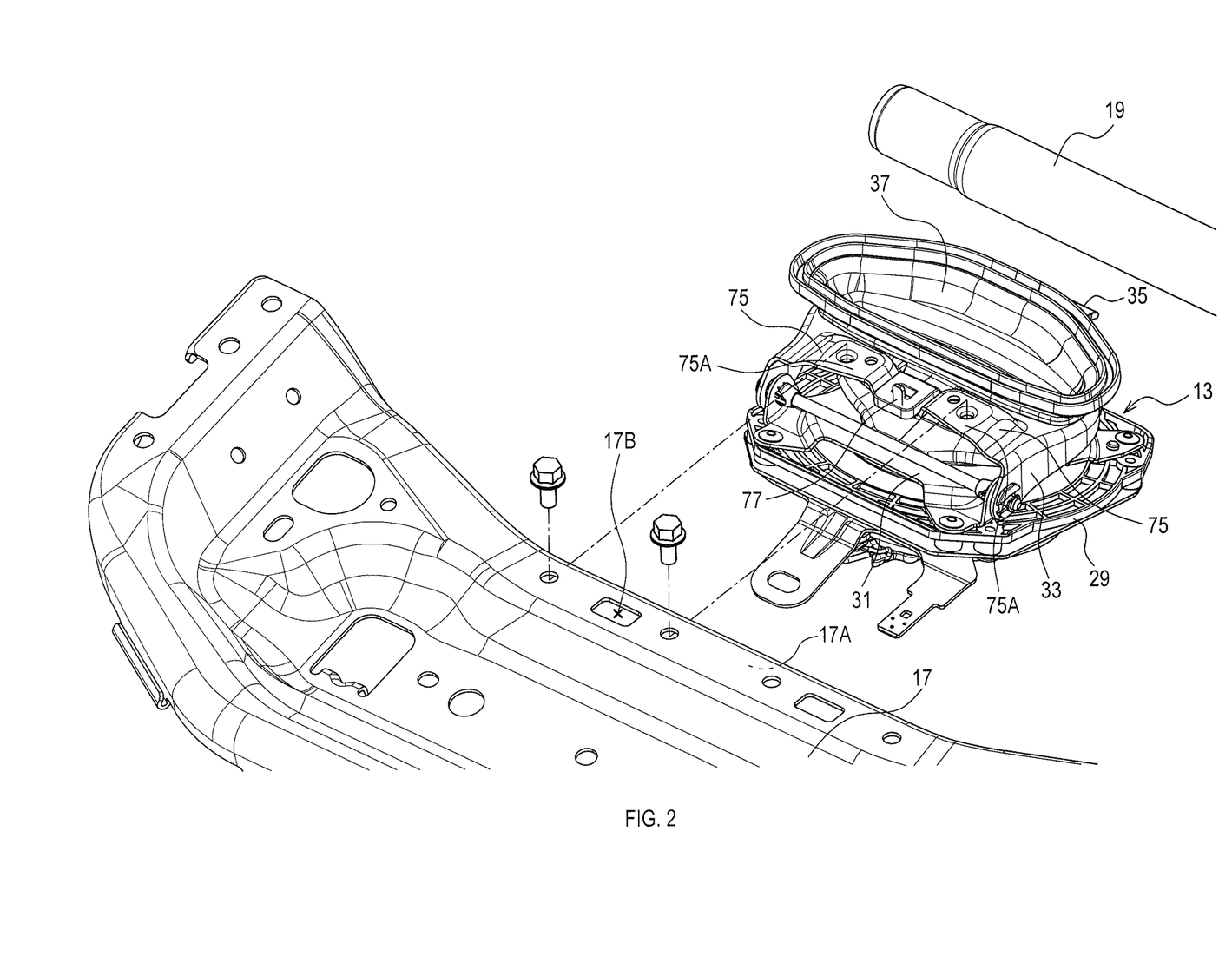
FIG. 2 is an exploded perspective view showing a mounting position for an air conditioning device.

With reference to FIGS. 1 and 2, an overall configuration of a vehicle seat 1 will be described. The vehicle seat 1 is a seat for an automobile. In the following descriptions, unless otherwise specifically stated, "front" refers to a front of a vehicle seat and an automobile, and "rear" refers to a rear of the vehicle seat and the automobile. The vehicle seat 1 comprises a seatback 3 to be used as a backrest for an occupant, and a seat cushion 5 to be used as a seating portion. An upper surface of the seat cushion 5 corresponds to one example of a seating surface.

The vehicle seat 1 comprises a front tilt mechanism 7 that is electrically operated. The front tilt mechanism 7 changes an angle of the seat cushion 5. Details of the front tilt mechanism 7 will be described later.

The vehicle seat 1 can change an angle of the seatback 3. The vehicle seat 1 comprises two slide rails 9 on a floor of the automobile. The seat cushion 5 is coupled to the slide rails 9. The seat cushion 5 is movable in a front-rear direction by sliding operations of the slide rails 9.

The vehicle seat 1 comprises a seat lifter 11 between the seat cushion 5 and the slide rails 9. The seat cushion 5 is movable in an up-down direction by operation of the seat lifter 11.

The vehicle seat 1 comprises an air conditioning device 13 in a region below the seat cushion 5. The air conditioning device 13 draws air in from an area where the seat cushion 5 is provided. Because of this drawing-in of the air, by the air conditioning device 13, from the area where the seat cushion 5 is provided, the seat cushion 5 is inhibited from getting soggy. A configuration of the air conditioning device 13 will be described later.

(2) Configuration of Seat Cushion 5

With reference to FIGS. 1 and 2, a configuration of the seat cushion 5 will be described. The seat cushion 5 comprises two side frames 15, a front panel 17, a front pipe 19, a rear pipe 21, two tilt arms 25, and a rotation shaft 27.

The front panel 17 bridges respective front ends of the two side frames 15. The front panel 17 supports an occupant's thigh from underneath.

Each of the front pipe 19 and the rear pipe 21 is a round pipe made of metal. Each of the front pipe 19 and the rear pipe 21 bridges the two side frames 15. The front pipe 19 is located rearward of the front panel 17. The rear pipe 21 is located rearward of the front pipe 19 and bridges respective end portions of the two side frames 15.

One of the two tilt arms 25 extends rearward from a left end of the front panel 17, and the other of the two tilt arms 25 extends rearward from a right end of the front panel 17. The rotation shaft 27 couples respective rear ends of the two tilt arms 25 to the two side frames 15 such that the rear ends of the two tilt arms 25 are rotatable. The front panel 17 and the two tilt arms 25 are rotatable about the rotation shaft 27. As a result of the rotation of the front panel 17 and the two tilt arms 25, the angle of the seat cushion 5 is changed. The front panel 17, the two tilt arms 25, and the rotation shaft 27 form the front tilt mechanism 7. The front tilt mechanism 7 further comprises a drive unit (not shown) that rotatably drives the front panel 17 and the two tilt arms 25.

(3) Configuration of Air Conditioning Device 13

Figure 3:
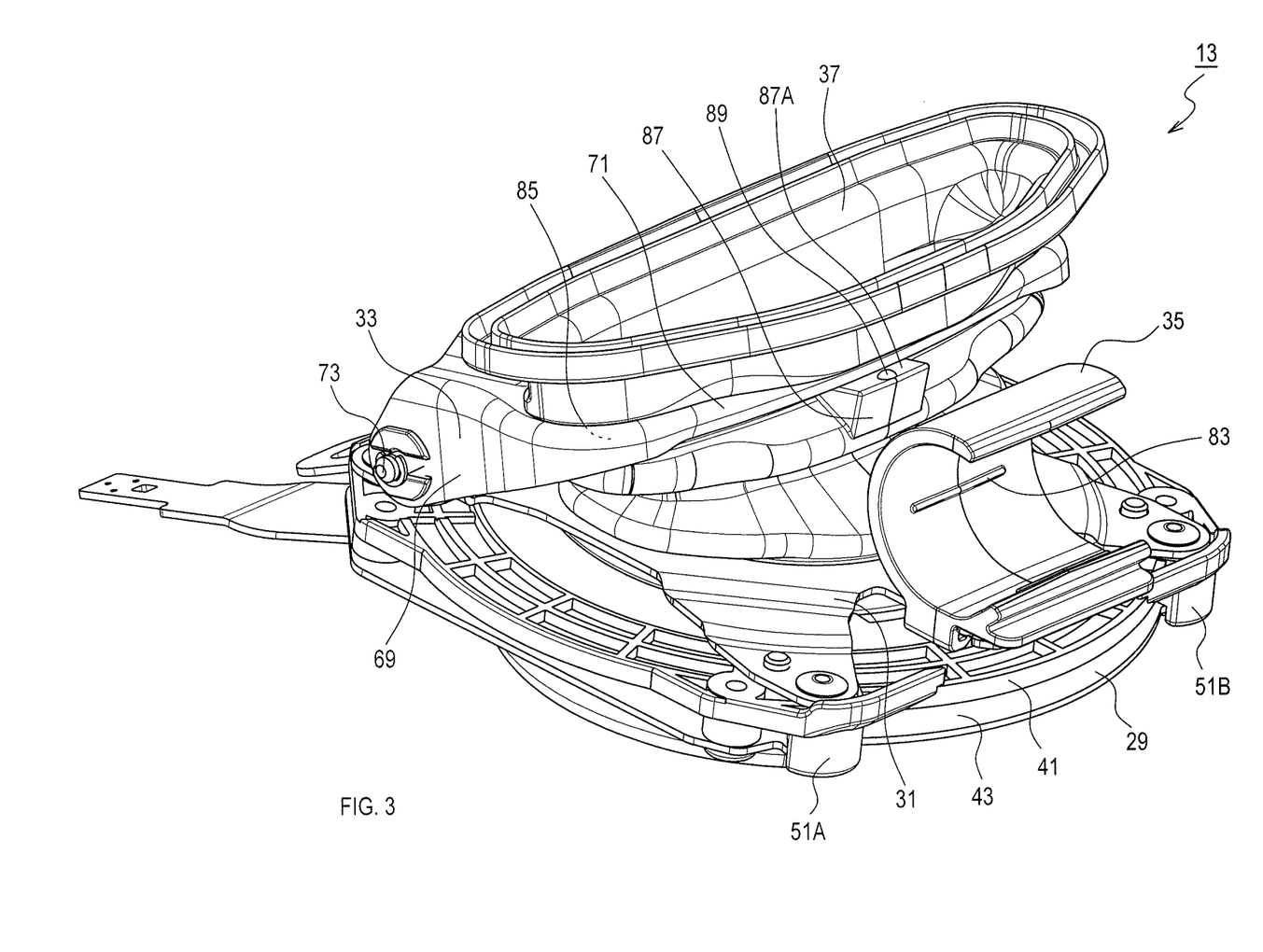
FIG. 3 is a perspective view showing a configuration of the air conditioning device.
Figure 4:
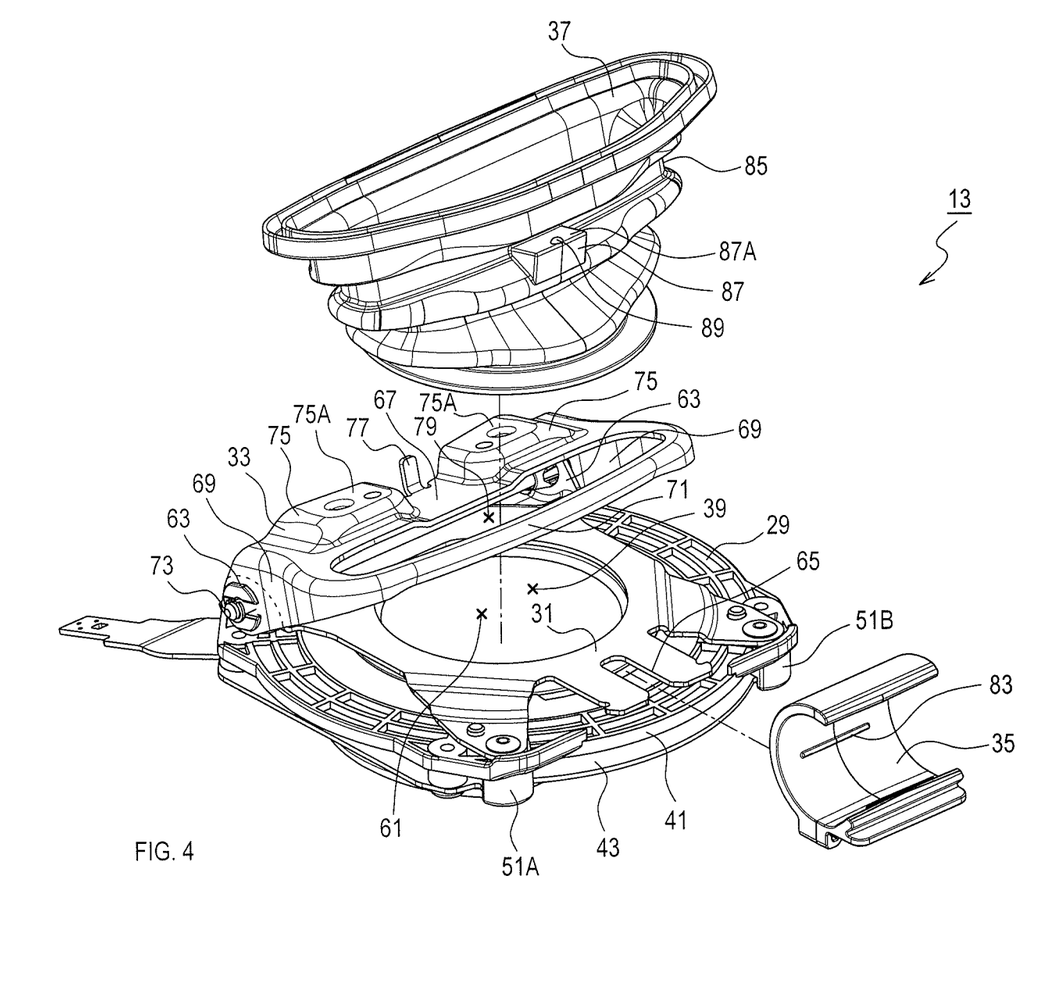
FIG. 4 is an exploded perspective view showing the configuration of the air conditioning device.
Figure 5:
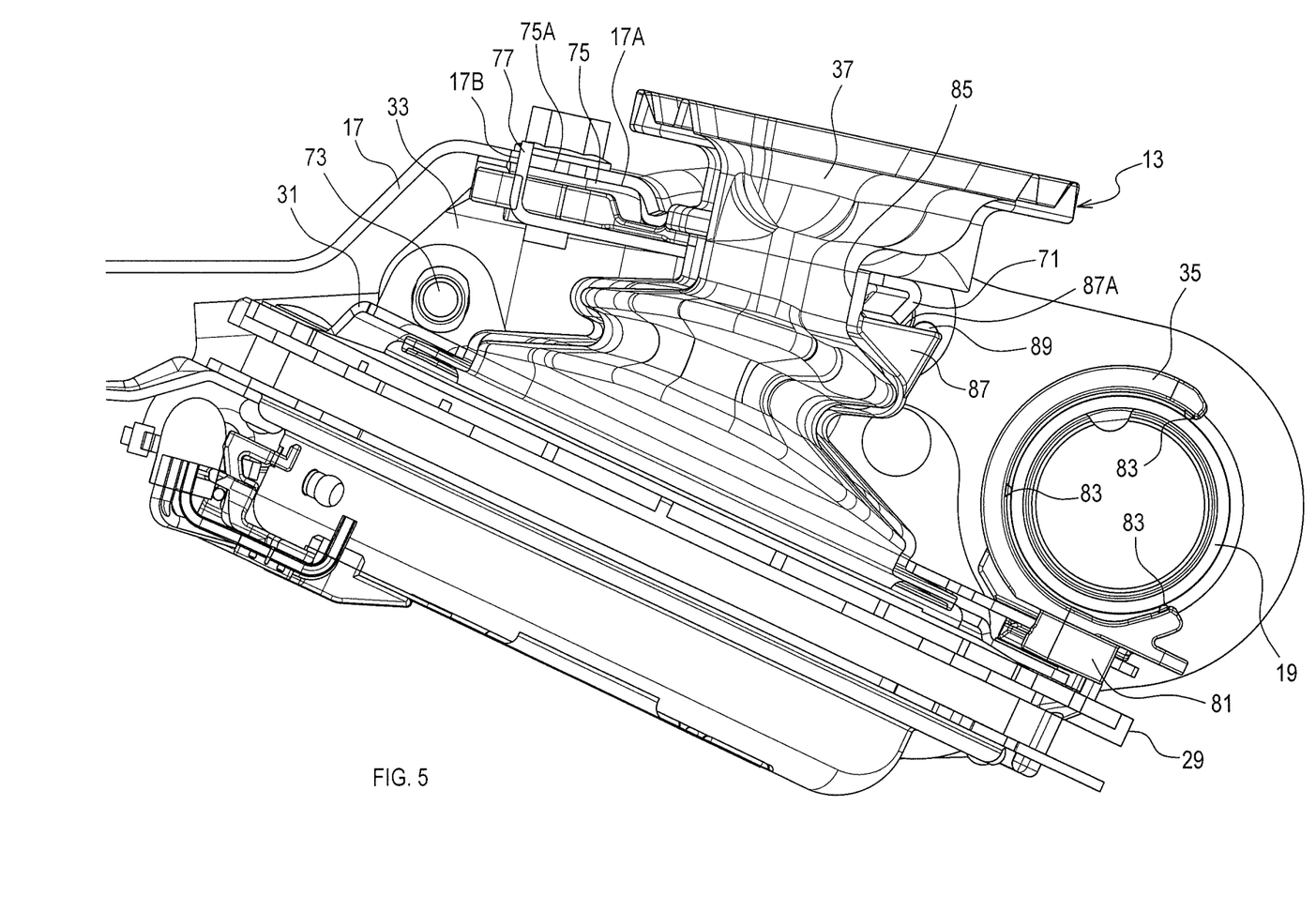
FIG. 5 is a side sectional view showing the air conditioning device and its peripheral members.

With reference to FIGS. 2 to 8, a configuration of the air conditioning device 13 will be described. As shown in FIGS. 3 to 5, the air conditioning device 13 comprises a fan 29, a mounting plate 31, a mounting bracket 33, a hook 35, and a duct 37.

Figure 7:
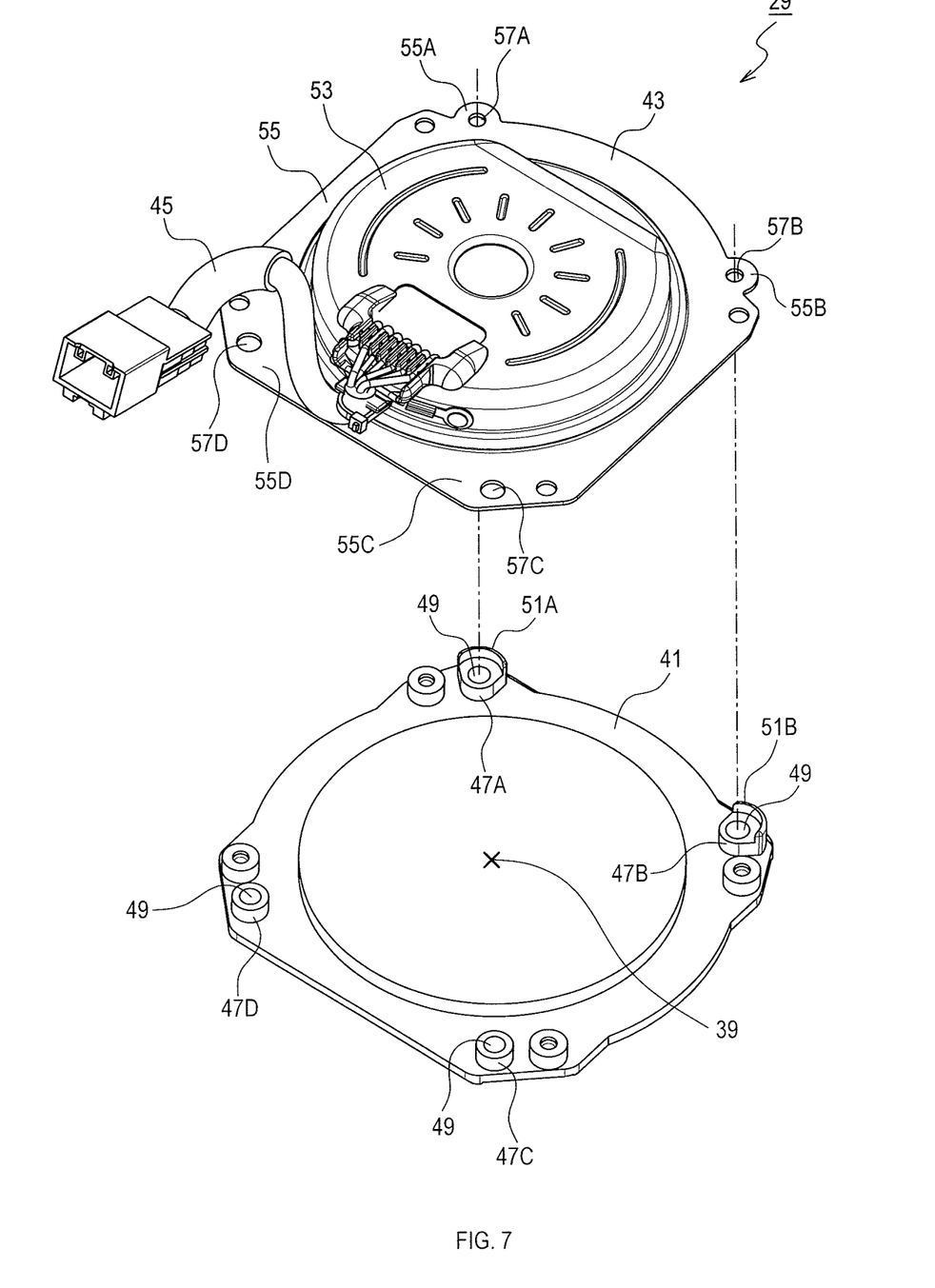
FIG. 7 is an exploded perspective view showing the configuration of the fan.

As shown in FIGS. 4 and 7, the fan 29 comprises a vent hole 39 on an upper surface thereof. The fan 29 can draw air in through the vent hole 39. The fan 29 may be configured to blow air out through the vent hole 39. The fan 29 may have a function of heating or cooling air.

Figure 6:
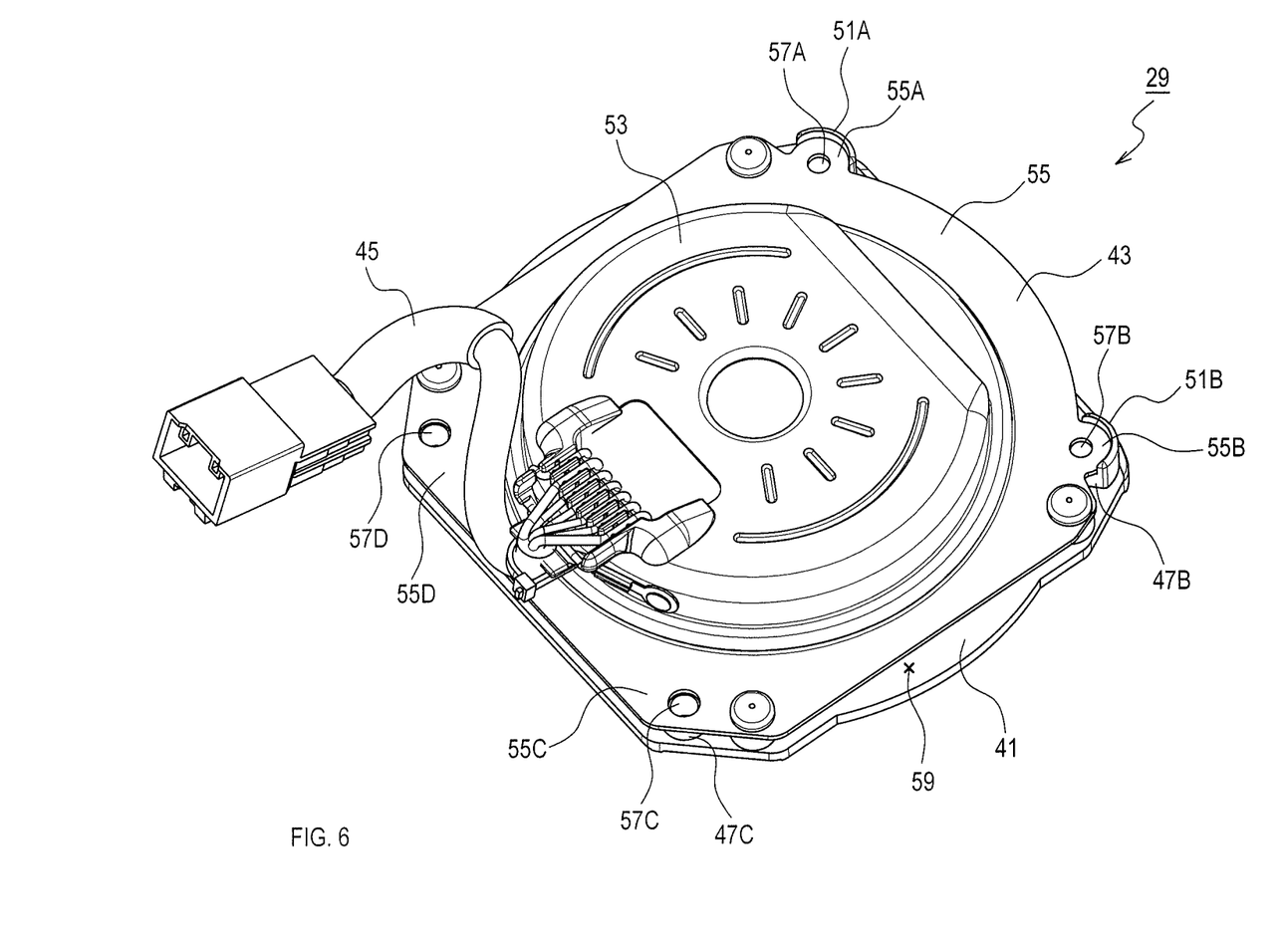
FIG. 6 is a perspective view showing a configuration of a fan.
Figure 8:
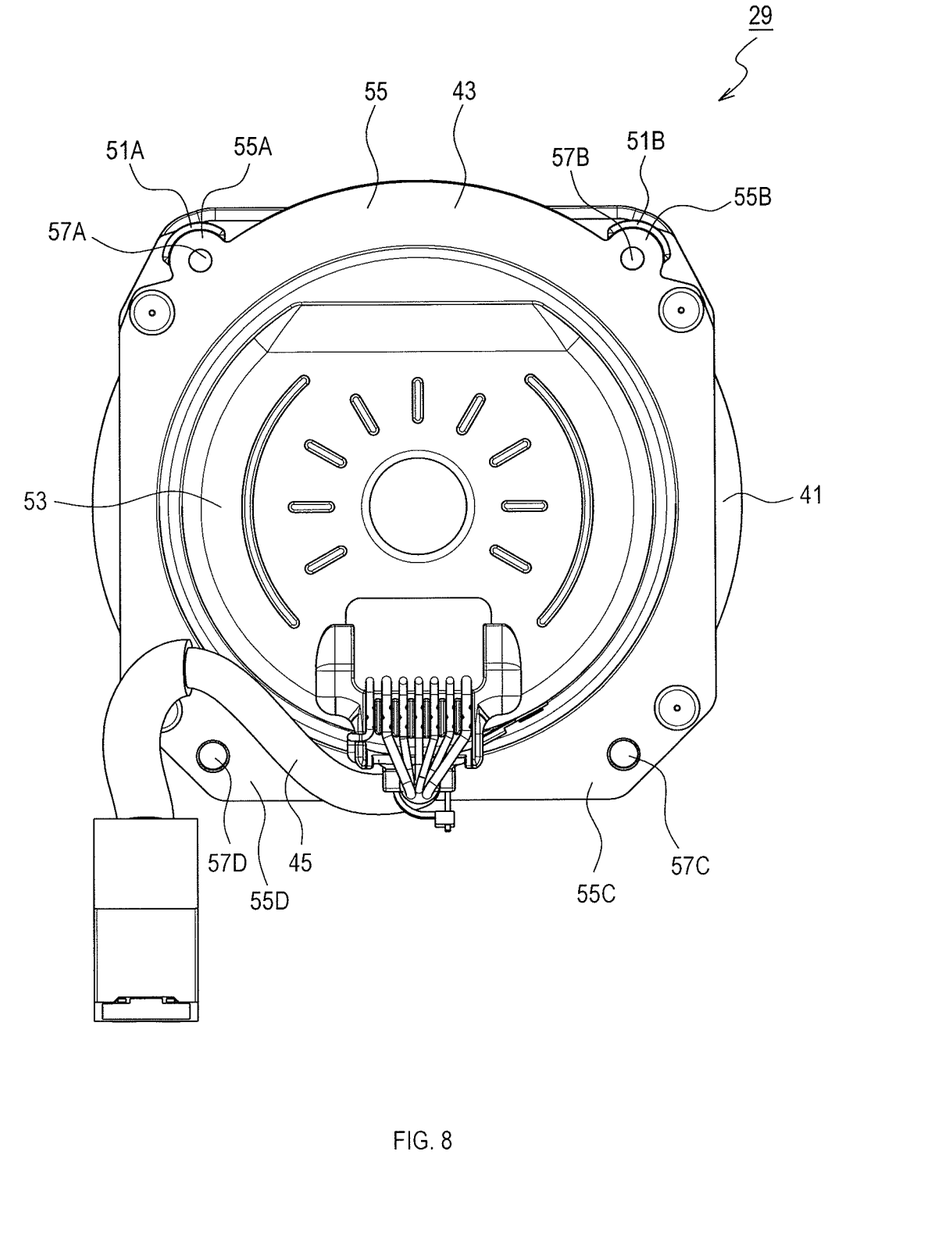
FIG. 8 is a plan view showing the configuration of the fan.

As shown in FIGS. 6 to 8, the fan 29 comprises an upper case 41, a lower case 43, a harness 45, and an air blowing mechanism; the air blowing mechanism is not shown in the figures. The combination of the upper case 41 and the lower case 43 corresponds to one example of a case module. The upper case 41 corresponds to one example of a first case. The lower case 43 corresponds to one example of a second case.

The upper case 41 is assembled to the lower case 43, thereby forming a case module of the fan 29. The aforementioned air blowing mechanism is housed in the case module of the fan 29. When viewed in a plan view, the upper case 41 has an approximately rectangular shape. The upper case 41 has a flat plate-like shape. The upper case 41 is located in an upper side of the fan 29 (that is, the side close to the seat cushion 5). The above-described vent hole 39 is formed in a central area of the upper case 41.

As shown in FIG. 7, the upper case 41 comprises seatings 47A, 47B, 47C, 47D, respectively, on four corners of the upper case 41. Each of the seatings 47A, 47B, 47C, 47D has a columnar shape and protrudes towards the lower case 43. When viewed in a plan view, the seatings 47A, 47B, 47C, 47D are disposed to be located at respective four vertices of a square. A screw hole 49 is provided in each of the seatings 47A, 47B, 47C, 47D. The seatings 47A, 47B, 47C, 47D correspond to one example of a stopper.

An outer circumferential portion of the seating 47A has a distal section that is distal to a center of the upper case 41 (i.e., the section located at an outer side of the fan 29). In this distal section, a rib 51A having an arc shape is provided. Likewise, in such distal section of an outer circumferential portion of the seating 47B, a rib 51B having an arc shape is provided. Heights of the ribs 51A, 51B are higher than heights of the seatings 47A, 47B. No rib is provided in an outer circumferential portion of each of the seatings 47C, 47D. A material of the upper case 41 including the ribs 51A, 51B is resin. The ribs 51A, 51B correspond to one example of a restrictor. Each of the ribs 51A, 51B comprises a contact surface to be in contact with the harness 45.

When viewed in a plan view, the lower case 43 has an approximately rectangular shape. The lower case 43 is located in a lower side of the fan 29 (that is, the side opposite to a side where the seat cushion 5 is provided). The lower case 43 comprises a central portion 53 formed in an approximately cylindrical shape and a flat portion 55 disposed around the central portion 53.

On the flat portion 55, screw through holes 57A, 57B, 57C, 57D are formed at positions corresponding to four corners of the lower case 43. The positions of the screw through holes 57A, 57B, 57C, 57D are specified such that in a case where the upper case 41 and the lower case 43 are assembled to each other, when viewed in a plan view, the screw through hole 57A overlies the seating 47A, the screw through hole 57B overlies the seating 47B, the screw through hole 57C overlies the seating 47C, and the screw through hole 57D overlies the seating 47D. The four corners of the lower case 43 at which the screw through holes 57A, 57B, 57C, 57D are formed correspond to one example of a stopped portion.

As shown in FIGS. 6 and 8, the flat portion 55 comprises outer peripheral sections 55A, 55B located in the vicinity of the screw through holes 57A, 57B, respectively. Each of the outer peripheral sections 55A, 55B is formed in a shape of an arc-shaped cutout, so that the ribs 51A, 51B do not abut the flat portion 55 when the upper case 41 and the lower case 43 are assembled to each other.

Accordingly, when an orientation of the lower case 43 with respect to the upper case 41 is an orientation shown in FIGS. 6 and 8 (hereinafter, referred to as "normal orientation"), the upper case 41 and the lower case 43 can be assembled to each other. The harness 45 is routed in respective rear regions of the upper case 41 and the lower case 43. When the orientation of the lower case 43 with respect to the upper case 41 is the normal orientation, the harness 45 can be coupled to other harnesses (not shown). The normal orientation corresponds to one example of a specified orientation.

The flat portion 55 comprises outer peripheral sections 55C, 55D located in the vicinity of the screw through holes 57C, 57D, respectively. The outer peripheral sections 55C, 55D, however, do not have the aforementioned shape of an arc-shaped cutout. Accordingly, if the lower case 43 is rotated by 180 degrees from the orientation shown in FIG. 8 and then, assembled to the upper case 41, such an assembling cannot be achieved; this is because the ribs 51A and 51B abut, respectively, the outer peripheral sections 55C and 55D before the lower case 43 sufficiently comes close to the upper case 41. Moreover, if the assembling of the lower case 43 to the upper case 41 by rotating the lower case 43 by 180 degrees from the orientation shown in FIG. 8 is achieved, the harness 45 cannot be coupled to other harnesses (not shown).

That is to say, when the orientation of the lower case 43 with respect to the upper case 41 is different from the normal orientation, the assembling of the lower case 43 to the upper case 41 is restricted by the ribs 51A, 51B.

The harness 45 is drawn out from an area in the vicinity of the regions where the screw through holes 57C, 57D are provided in the lower case 43.

In order to assemble the upper case 41 and the lower case 43 to each other, a screw is inserted into the screw through hole 57A and screwed into the screw hole 49 of the seating 47A. Likewise, a screw is inserted into the screw through hole 57B and screwed into the screw hole 49 of the seating 47B; a screw is inserted into the screw through hole 57C and screwed into the screw hole 49 of the seating 47C; and a screw is inserted into the screw through hole 57D and screwed into the screw hole 49 of the seating 47D. The aforementioned screws correspond to one example of a securing member.

As shown in FIGS. 6 and 8, the screw inserted into the screw through hole 57A is surrounded by the rib 51A when viewed horizontally from an outer circumference of the fan 29. The screw inserted into the screw through hole 57B is surrounded by the rib 51B when viewed horizontally from the outer circumference of the fan 29.

As shown in FIG. 6, when the upper case 41 and the lower case 43 are assembled to each other, a gap 59 exists between the upper case 41 and the lower case 43. The gap 59 has a height that corresponds to the heights of the seatings 47A, 47B, 47C, 47D.

As shown in FIG. 4, the mounting plate 31 is an approximately rectangular-shaped metal plate. The mounting plate 31 is secured by screw-fastening to an upper surface of the lower case 43. The mounting plate 31 comprises an opening 61 so as not to close the vent hole 39. The mounting plate 31 comprises two shaft supports 63 extending upwardly, one of which is provided in a left end in a front section of the mounting plate 31, and the other of which is provided in a right end in the front section of the mounting plate 31. The mounting plate 31 comprises a rail groove 65 in a rear section thereof.

As shown in FIG. 4, the mounting bracket 33 is a member formed of one piece of a metal plate. The mounting bracket 33 comprises a top panel 67, two side parts 69, and a side part 71. The two side parts 69 are formed such that left and right edges of the top panel 67 are bent to hang down. The side part 71 is formed such that a rear edge of the top panel 67 is bent to hang down.

Respective front sections of the two side parts 69 are disposed so as to overlap the two shaft supports 63 when viewed from the side. A shaft pin 73 penetrates through the two side parts 69 and the two shaft supports 63. An axial direction of the shaft pin 73 is parallel to the seat width direction. Thus, the mounting bracket 33 is rotatable about the shaft pin 73 with respect to the mounting plate 31.

As shown in FIGS. 4 and 5, two mounting seats 75 are provided in a front section of the top panel 67. The mounting seat 75 has a shape of a base seat protruding upwardly. An upper surface 75A of the mounting seat 75 is flat.

As shown in FIGS. 2 and 5, the upper surface 75A abuts, from below, an underside 17A of the front panel 17 at a rear side of the front panel 17. The mounting seat 75 and the front panel 17 are secured to each other by screw-fastening.

As shown in FIG. 4, between the two mounting seats 75, the top panel 67 comprises a hooking claw 77 formed by being cut and raised upwardly. As shown in FIGS. 1 and 5, the hooking claw 77 engages into an engagement hole 17B provided in the rear side of the front panel 17.

As shown in FIG. 4, an opening 79 is formed in a rear section of the top panel 67. The opening 79 is located above the vent hole 39 and the opening 61.

As shown in FIGS. 3 to 5, the hook 35 is formed to have a C-shaped cross section. The hook 35 is disposed to open toward the rear. As shown in FIG. 5, the hook 35 comprises an engagement piece 81 protruding downwardly on an underside of the hook 35. The engagement piece 81 is engaged with the rail groove 65, thereby attaching the hook 35 to the mounting plate 31. The hook 35 is slidable with respect to the mounting plate 31 in the front-rear direction.

As shown in FIG. 5, the hook 35 is externally fitted to the front pipe 19. The hook 35 is rotatable about a center axis of the front pipe 19. Accordingly, the air conditioning device 13 is also rotatable about the center axis of the front pipe 19.

As shown in FIGS. 3 to 5, the hook 35 comprises at least one protruding portion 83 (in the present embodiment, a plurality of protruding portions 83) on an abutment surface thereof to be abutted against the front pipe 19. Because the plurality of protruding portions 83 are provided, the contact area between the hook 35 and the front pipe 19 is reduced, thereby producing an effect that causes the hook 35 to rotate smoothly with respect to the front pipe 19.

As shown in FIGS. 4 and 5, the duct 37 is a tubular member made of rubber. The duct 37 is flexible. A lower end of the duct 37 is coupled to the vent hole 39 of the fan 29. An upper end of the duct 37 is coupled to a coupling opening (not shown) in an air-passage groove provided in the seat cushion 5.

As shown in FIG. 3, the duct 37 is inserted into the opening 79 of the mounting bracket 33. As shown in FIG. 4, the duct 37 comprises a constricted section 85. The constricted section 85 is constricted and narrower than upper and lower sections from the constricted section 85 in the duct 37. The mounting bracket 33 supports the duct 37 with the constricted section 85. For this reason, when the mounting bracket 33 is rotated with respect to the mounting plate 31, a portion of the duct 37 located in the vicinity of the constricted section 85 moves together with the mounting bracket 33.

As shown in FIGS. 3 to 5, the duct 37 comprises a holder 87 protruding rearward in a rear side of the duct 37. The holder 87 is a part of the duct 37. The holder 87 is located lower than the constricted section 85 in the up-down direction. The holder 87 is located at a side opposite to the shaft pin 73 when viewed from a main body of the duct 37 (i.e., the main body is a portion of the duct 37 excluding the holder 87). In an upper surface 87A of the holder 87, one protrusion 89 having a hemispherical shape is formed. A plurality of protrusions 89 may be provided. A portion of the upper surface 87A excluding the protrusion 89 is a flat surface.

In a state where the mounting seat 75 is not mounted to the underside 17A of the front panel 17, as shown in FIG. 5, the side part 71 of the mounting bracket 33 abuts, from above, the upper surface 87A. Consequently, the mounting bracket 33 is maintained at a specified position. In this case, the upper surface 75A of the mounting seat 75 is approximately parallel to the underside 17A. That is, the holder 87 abuts the side part 71, thereby maintaining the upper surface 75A and the underside 17A such that the upper surface 75A and the underside 17A are approximately parallel to each other. The abutment position of the side part 71 is located in a region forward of the protrusion 89 in the upper surface 87A.

2. Relationship Between Operation of Front Tilt Mechanism 7 and Operation of Air Conditioning Device 13

The front tilt mechanism 7 causes the two tilt arms 25 to rotate about the rotation shaft 27, thereby raising or lowering the front panel 17. The mounting seat 75 is secured to the front panel 17 and therefore, when the front panel 17 is raised or lowered, the mounting bracket 33 rotates about the shaft pin 73 in the raising-and-lowering direction of the mounting seat 75. In addition, the hook 35 rotates with respect to the front pipe 19.

Moreover, when the front panel 17 is raised or lowered, a distance between the front panel 17 and the front pipe 19 changes. A distance between the mounting seat 75 and the hook 35 is made to correspond to the distance between the front panel 17 and the front pipe 19 by causing the hook 35 to slide with respect to the mounting plate 31.

Accordingly, when the front tilt mechanism 7 is operated, a load is less likely to be applied to the mounting seat 75 and the hook 35 in the air conditioning device 13.

3. Effects Exhibited by Air Conditioning Device 13

The Air Conditioning Device 13 Exhibits Following Effects.

(1A) When the orientation of the lower case 43 with respect to the upper case 41 is different from the normal orientation, the assembling of the upper case 41 and the lower case 43 to each other is restricted. For this reason, the assembling of the upper case 41 and the lower case 43 to each other in the state where the orientation of the lower case 43 with respect to the upper case 41 is different from the normal orientation can be inhibited.

(1B) The ribs 51A, 51B are members that restrict the assembling of the upper case 41 and the lower case 43 to each other when the orientation of the lower case 43 with respect to the upper case 41 is different from the normal orientation. Thus, it can be further ensured that the assembling of the upper case 41 and the lower case 43 to each other in the state where the orientation of the lower case 43 with respect to the upper case 41 is different from the normal orientation is inhibited.

(1C) The upper case 41 and the lower case 43 are assembled to each other with the screws. When viewed horizontally from one side of the outer circumference of each of the ribs, each of the ribs 51A, 51B surrounds the screw. For this reason, the screw can be inhibited from interfering with or damaging peripheral members that are peripheral to the screw. Examples of the peripheral members include a harness, etc.

(1D) The ribs 51A, 51B are formed of a material including resin. Thus, damage to the harness 45 by the ribs 51A, 51B can be inhibited. The ribs 51A, 51B may be formed of resin.

OTHER EMBODIMENTS

The embodiments for carrying out the present disclosure have been described; however, the present disclosure is not limited to the above-described embodiments and can be carried out in various modified modes.

(1) The air conditioning device 13 may be mounted to the seatback 3. Also, the air conditioning device 13 may be mounted to each of the seat cushion 5 and the seatback 3.

(2) Only one of the ribs 51A and 51B may be provided in the air conditioning device 13.

(3) The ribs 51A, 51B may be provided in the lower case 43 and protrude towards the upper case 41. In this case, the upper case 41 may have a shape that does not allow the upper case 41 to abut the ribs 51A, 51B when the orientation of the lower case 43 with respect to the upper case 41 is the normal orientation, and that allows the upper case 41 to abut at least one of the ribs 51A, 51B when the orientation of the lower case 43 with respect to the upper case 41 is different from the normal orientation.

(4) The restrictor may be a member other than the rib. For example, the upper case 41 may comprise a convex member protruding towards the lower case 43. Examples of the convex member include a stick-like convex member, a plate-like convex member, etc. In addition, the lower case 43 may comprise, at a position facing to the convex member when the orientation of the lower case 43 with respect to the upper case 41 is the normal orientation, a concave member that receives at least a part of the convex member. Moreover, it may be configured such that the lower case 43 does not comprise the aforementioned concave member at, at least, a part of a position facing to the convex member when the orientation of the lower case 43 with respect to the upper case 41 is different from the normal orientation.

The aforementioned configurations enable the upper case 41 and the lower case 43 to be assembled to each other when the orientation of the lower case 43 with respect to the upper case 41 is the normal orientation. In addition, with the aforementioned configurations, the assembling of the upper case 41 and the lower case 43 to each other is restricted when the orientation of the lower case 43 with respect to the upper case 41 is different from the normal orientation.

Moreover, the aforementioned convex member may be provided in the lower case 43, and the aforementioned concave member may be provided in the upper case 41.

(5) In the above-described embodiments, the vehicle seat 1 is employed in an automobile; however, the vehicle seat 1 may be employed in vehicles other than automobiles (for example, railroad vehicles, airplanes, ships, etc.).

(6) In each of the above-described embodiments, functions that one constituent element has may be divided among a plurality of constituent elements; alternatively, functions that a plurality of constituent elements have may be integrated to one constituent element. Moreover, a part of the configuration of each of the above-described embodiments may be omitted. Furthermore, at least a part of the configuration of each of the above-described embodiments may be added to, replaced with, etc. a configuration of another embodiment of the above-described embodiments. Any modes that are included in a technical idea specified by the languages in the claims are embodiments of the present disclosure.

What is claimed is:

1. An air conditioning device provided on an underside of a seating surface of a vehicle seat, the air conditioning device comprising:
a fan that comprises a case module and a restrictor,
the case module comprising a first case and a second case, the first case being located at a side of the fan where the seating surface is located, and the second case being located at a side of the fan opposite to the seating surface and being assembled to the first case,
the restrictor projects from a generally planar interior surface of one of the first case and the second case, in a direction transverse to the planar interior surface of the one of the first and second cases, is spaced from peripheral portions of the first and second cases and has a structure that restricts assembly of the first case and the second case to each other when an orientation of the second case with respect to the first case is different from a specified orientation, and
a plurality of spaced projections on the one of the first and second cases, that extend towards the other of the first and second cases, the restrictor extending from an outer peripheral portion of a free end of at least one of the projections and preventing the first and second cases from abutting when corresponding surfaces of the other of the first and second cases is in an orientation different from the specified orientation.

2. The air conditioning device according to claim 1, wherein the restrictor comprises at least one rib provided in a first one of the first case and the second case, and extending from an outer peripheral surface of at least one of the plurality of projections, the rib extending about a portion of the periphery of the projection,
wherein when the orientation of the second case with respect to the first case is different from the specified orientation, the at least one rib abuts a second one of the first case and the second case, thereby restricting assembly of the first case and the second case to each other.

3. The air conditioning device according to claim 2, wherein the first case comprises a stopper and the second case comprises a stopped portion, and the stopper and the stopped portion are assembled to each other via a securing member, and
wherein the at least one rib surrounds at least a part of the securing member when viewed horizontally from one side of an outer circumference of the at least one rib.

4. The air conditioning device according to claim 2, wherein a harness is routed in a rear side of the air conditioning device, and
wherein a material of a surface of the at least one rib that contacts the harness includes resin.

5. The air conditioning device according to claim 2, wherein an outer circumferential surface of the at least one rib has an arcuate shape.

6. The air conditioning device according to claim 2, a surface of the at least one rib includes a resin.

7. The air conditioning device according to claim 2, wherein the first case comprises a resin.

8. An air conditioning device provided on an underside of a seating surface of a vehicle seat, the air conditioning device comprising:
a fan that comprises a case module and a restrictor,
the case module comprising a first case and a second case, the first case being located at a side of the fan where the seating surface is located, and the second case being located at a side of the fan opposite to the seating surface and being assembled to the first case, each of first case and second case comprising generally parallel, generally planar peripheral portions with a gap between the peripheral portion of the first case and the peripheral portion of the second case in an assembled condition, the gap providing airflow into the region between the first and second cases and
the restrictor extends in a direction transverse to the planar surfaces of first and second cases and has a structure that restricts assembly of the first case and the second case to each other when an orientation, in a direction parallel to the generally planar peripheral portion of the second case with respect to the first case is different from a specified orientation, the restrictor being positioned inwardly of a periphery of one of the first case and the second case.

9. The air conditioning device according to claim 8, wherein the restrictor comprises at least one rib provided in a first one of the first case and the second case, and, when the orientation of the second case with respect to the first case is different from the specified orientation, the at least one rib abuts a second one of the first case and the second case, thereby restricting assembly of the first case and the second case to each other.

10. The air conditioning device according to claim 9, wherein the first case comprises a stopper and the second case comprises a stopped portion, and the stopper and the stopped portion are assembled to each other via a securing member, and the at least one rib surrounds at least a part of the securing member when viewed horizontally from one side of an outer circumference of the at least one rib.

11. The air conditioning device according to claim 9, wherein a harness is routed in a rear side of the air-conditioning device and wherein a contact surface of the at least one rib that contacts the harness includes resin.

12. The air conditioning device according to claim 9, wherein an outer circumferential surface of the at least one rib has an arcuate shape.

13. The air conditioning device according to claim 8, the gap extending over an entire circumference of the peripheral portion of the first case and peripheral portion of the second case.

14. The air conditioning device according to claim 9, wherein the at least one rib comprises a plurality of discrete ribs spaced about a periphery of the first one of the first case and the second case.

15. The air conditioning device according to claim 8, the gap being defined by a plurality of discrete projections extending from one of the first case and the second case towards an other of the first case and the second case.

16. The air-conditioning device according to claim 1, at least one of the plurality of spaced projections comprises a discrete apertured structure extending from a generally planar surface of one of the first and second cases.

17. An air conditioning device for a vehicle seat, the air conditioning device comprising:
an upper case including:
a centrally located vent hole defining a central axis,
a first seating,
a first screw hole located in the first seating,
a first rib extending downward from the first seating, and extending along a first arc of less than 180 degrees with respect to the first screw hole, a first bushing located adjacent to the first seating;
a second seating located at approximately 90 degrees from the first seating with respect to the central axis,
a second screw hole located in the second seating,
a second rib extending downward from the second seating, and extending along a second arc of less than 180 degrees with respect to the second screw hole,
a second bushing located adjacent to the second seating;
a third seating located at approximately 90 degrees from the second seating with respect to the central axis,
a third screw hole located in the third seating,
a third bushing located adjacent to the third seating;
a fourth seating located at approximately 90 degrees from the third seating with respect to the central axis,
a fourth screw hole located in the fourth seating, and
a fourth bushing located adjacent to the fourth seating; and a lower case including:
a central portion, and
a flat portion including:
a first through hole alignable with the first screw hole,
a first outer peripheral section shaped to mate with the first rib,
a first auxiliary through hole alignable with the first bushing,
a second through hole alignable with the second screw hole,
a second outer peripheral section shaped to mate with the second rib,
a second auxiliary through hole alignable with the second bushing,
a third through hole alignable with the third screw hole,
a third auxiliary through hole alignable with the third bushing,
a fourth through hole alignable with the fourth screw hole, and
a fourth auxiliary through hole alignable with the fourth bushing, and a central portion.

18. The air conditioning device of claim 17, wherein the seatings and bushing are sized to provide a generally uniform vertical gap between the upper case and the flat portion of the lower case after assembly of the upper case to the lower case, such that inlet air flows through the gap when the air conditioning device is operated.

19. The air conditioning device of claim 18, wherein the central portion of the lower case includes:
a central hole,
two curved slots, and
radially oriented straight slots.

20. The air conditioning device of claim 19, further comprising:
a wiring harness attached to the lower case.

* * * * *